(12) United States Patent
Rafii et al.

(10) Patent No.: US 7,379,163 B2
(45) Date of Patent: May 27, 2008

(54) METHOD AND SYSTEM FOR AUTOMATIC GAIN CONTROL OF SENSORS IN TIME-OF-FLIGHT SYSTEMS

(75) Inventors: Abbas Rafii, Palo Alto, CA (US); Salih Burak Gokturk, Mountain View, CA (US)

(73) Assignee: Canesta, Inc., Sunnyvale, CA (US)

( * ) Notice: Subject to any disclaimer, the term of this patent is extended or adjusted under 35 U.S.C. 154(b) by 15 days.

(21) Appl. No.: 11/349,310

(22) Filed: Feb. 6, 2006

(65) Prior Publication Data

US 2006/0176467 A1 Aug. 10, 2006

Related U.S. Application Data

(60) Provisional application No. 60/650,916, filed on Feb. 8, 2005.

(51) Int. Cl.
*G01C 3/08* (2006.01)
(52) U.S. Cl. .................................................... 356/4.07
(58) Field of Classification Search ................ 356/4.07
See application file for complete search history.

(56) References Cited

U.S. PATENT DOCUMENTS 5,981,965 A * 11/1999 Pryor et al. ............ 250/559.23

* cited by examiner

*Primary Examiner*—Thomas H. Tarcza
*Assistant Examiner*—Luke Ratcliffe
(74) *Attorney, Agent, or Firm*—Canesta, Inc.; Michael A. Kaufman

(57) ABSTRACT

Performance of pixel detectors in a TOF imaging system is dynamically adjusted to improve dynamic range to maximize the number of pixel detectors that output valid data. The invention traverses the system-acquired z depth, the brightness, and the active brightness images, and assigns each pixel a quantized value. Quantization values encompass pixels receiving too little light, normal light, to too much light. Pixels are grouped into quantized category groups, whose populations are represented by a histogram. If the number of pixels in the normal category exceeds a threshold, no immediate corrective action is taken. If the number of pixel receiving too little (or too much) light exceeds those receiving too much (or too little) light, the invention commands at least one system parameter change to increase (or decrease) light reaching the pixels. Controllable TOF system parameters can include exposure time, common mode resets, video gain, among others.

20 Claims, 6 Drawing Sheets

```
for r=1 to number of rows for c=1 to number of columns if (depth_Image(r,c) = NOT_VALID)
           & (brightnessImage(r,c) > Threshold1)
            Pixel_Type(r,c) = TOO_MUCH_LIGHT;

else if (depth_Image(r,c) = NOT_VALID)
           & (activeBrightnessImage(r,c) < Threshold2)
            Pixel_Type(r,c) = NOT_ENOUGH_LIGHT;

else if (depth_Image(r,c) = NOT_VALID)
           & (activeBrightnessImage(r,c) < Threshold3)
            Pixel_Type(r,c) = NO_LIGHT;

else Pixel_Type(r,c) = NORMAL_LIGHT;

end end
```

FIG. 4

```
if (Pixel_Count(NORMAL_LIGHT)>Threshold4)

do nothing;

else if (Pixel_Count(NOT_ENOUGH_LIGHT)>Pixel_Count(TOO_MUCH_LIGHT))

Vary a setting to increase the received light (increase exposure (shutter),
    or increase video gain, or decrease CMR)

else if (Pixel_Count(NOT_ENOUGH_LIGHT)<Pixel_Count(TOO_MUCH_LIGHT))

Vary a setting to decrease the received light (decrease exposure (shutter),
    or decrease video gain, or increase CMR)

end
```

FIG. 5

Function f(ΔL,L):

Good_Pixel_Count=0;

Change_Ratio = (L+ΔL)/L;

for i=NORMAL_LIGHT_BRIGHTNESS_START_INTENSITY to
  NORMAL_LIGHT_BRIGHTNESS_END_INTENSITY histogram_new_brightness(i)=histogram_new_brightness(i/ Change_Ratio);

Good_Pixel_Count = Good_Pixel_Count + histogram_new_brightness(i);

end for i=NORMAL_LIGHT_ACTIVE_BRIGHTNESS_START_INTENSITY to
  NORMAL_LIGHT_ACTIVE_BRIGHTNESS_END_INTENSITY histogram_new_active_brightness(i)=histogram_new_active_brightness(i/ Change_Ratio);

Good_Pixel_Count = Good_Pixel_Count + histogram_new_active_brightness(i);

end return Good_Pixel_Count;

FIG. 6

METHOD AND SYSTEM FOR AUTOMATIC GAIN CONTROL OF SENSORS IN TIME-OF-FLIGHT SYSTEMS

CROSS-REFERENCES TO RELATED APPLICATIONS

Priority is claimed from co-pending U.S. provisional patent application No. 60/650,916 filed 8 Feb. 2005 entitled "A Method for Automated Gain Control on Time of Flight Sensors", Salih Burak Gokturk, inventor, Canesta, Inc., assignee.

FIELD OF THE INVENTION

The invention relates generally to CMOS-implementable image sensors suitable for time-of-flight three-dimensional applications including range and camera sensors, and more specifically to dynamically varying at least one TOF system parameter to maximize the number of photodetector sensors operating within their intended dynamic range. In this fashion, more reliable depth measurement data is obtained from a greater number of pixel photodiode sensors.

BACKGROUND OF THE INVENTION

Electronic camera and range sensor systems that provide a measure of distance z from the system to a target object are known in the art. Many such systems approximate the range to the target object based upon luminosity or brightness information obtained from the target object. Some such systems are passive and respond to ambient light reflected from the target object, while other systems emit and then detect emitted light reflected from the target object. However brightness or luminosity-based systems may erroneously yield the same measurement information for a distant target object that may be large with a shiny surface and is thus highly reflective, as for a smaller target object that is closer to the system but has a dull surface that is less reflective.

Some range finder autofocus cameras employ detectors to approximate average distance from the camera to the target object by examining relative luminosity (brightness) data obtained from the object. In some applications such as range finding binoculars, the field of view is sufficiently small such that all objects in focus will be at substantially the same distance. But in general, luminosity-based systems do not work well and are subject to error, as noted above.

Some cameras and binoculars employ active infrared (1R) autofocus systems that produce a single distance value that is an average or a minimum distance to all targets within the field of view. Other camera autofocus systems often require mechanical focusing of the lens onto the subject to determine distance. At best these prior art focus systems can focus a lens onto a single object in a field of view, but cannot simultaneously measure distance for all objects in the field of view.

In general, a reproduction or approximation of original luminosity values in a scene permits the human visual system to understand what objects were present in the scene and to estimate their relative locations stereoscopically. For non-stereoscopic images such as those rendered on an ordinary television screen, the human brain assesses apparent size, distance and shape of objects using past experience. Specialized computer programs can approximate object distance under special conditions.

Stereoscopic images allow a human observer to more accurately judge the distance of an object. However it is challenging for a computer program to judge object distance from a stereoscopic image. Errors are often present, and the required signal processing requires specialized hardware and computation. Stereoscopic images are at best an indirect way to produce a three-dimensional image suitable for direct computer use.

Many applications require directly obtaining a three-dimensional rendering of a scene. But in practice it is difficult to accurately extract distance and velocity data along a viewing axis from luminosity measurements. Other applications may require accurate distance and velocity tracking, for example an assembly line welding robot that must determine the precise distance and speed of the object to be welded, or an imaging warning system for use in a motor vehicle. The necessary distance measurements may be erroneous due to varying lighting conditions and other shortcomings noted above. Such applications would benefit from a system that could directly capture three-dimensional imagery.

Some prior art system seek to acquire three dimensional images using mechanical devices. For example, scanning laser range finding systems raster scan an image by using mirrors to deflect a laser beam in the x-axis and perhaps the y-axis plane. The angle of deflection of each mirror is used to determine the coordinate of an image pixel being sampled. Such systems require precision detection of the angle of each mirror to determine which pixel is currently being sampled. Understandably having to provide precision moving mechanical parts add bulk, complexity, and cost to such range finding system. Further, because these systems sample each pixel sequentially, the number of complete image frames that can be sampled per unit time is limited. (It is understood that the term "pixel" can refer to an output result produced from one or more detectors in an array of detectors.) Although specialized three dimensional imaging systems exist in the nuclear magnetic resonance and scanning laser tomography fields, such systems require substantial equipment expenditures. Further, these systems are obtrusive, and are dedicated to specific tasks, e.g., imaging internal body organs.

Rather than rely exclusively upon acquiring luminosity data, actively or passively, a more accurate distance measuring system is the so-called time-of-flight (TOF) system. FIG. 1 depicts an exemplary TOF system, as described in U.S. Pat. No. 6,323,942 entitled CMOS-Compatible Three-Dimensional Image Sensor IC (2001), which patent is incorporated herein by reference as further background material. TOF system 100 can be implemented on a single IC 110, without moving parts and with relatively few off-chip components. System 100 includes a two-dimensional array 130 of pixel detectors 140, each of which has dedicated circuitry 150 for processing detection charge output by the associated detector. In a typical application, array 130 might include 100×100 pixels 230, and thus include 100×100 processing circuits 150. IC 110 also includes a microprocessor or microcontroller unit 160, memory 170 (which preferably includes random access memory or RAM and read-only memory or ROM), a high speed distributable clock 180, and various computing and input/output (I/O) circuitry 190. I/O circuitry 190 includes functions such as analog-to-digital (A/D) conversion of the output signals from the pixel photodetectors in array 130, and system video gain. Among other functions, controller unit 160 may perform distance to object and object velocity calculations.

Under control of microprocessor 160, a source of optical energy 120 is periodically energized and emits optical energy via lens 125 toward an object target 20. Typically the optical energy is light, for example emitted by a laser diode or LED device 120. Some of the emitted optical energy will be reflected off the surface of target object 20, and will pass through an aperture field stop and lens, collectively 135, and will fall upon two-dimensional array 130 of pixel detectors 140 where an image is formed. Each imaging pixel detector 140 measures both intensity or amplitude of the optical energy received, and the phase-shift of the optical energy as it travels from emitter 120, through distance Z to target object 20, and then distance again back to imaging sensor array 130. For each pulse of optical energy transmitted by emitter 120, a three-dimensional image of the visible portion of target object 20 is acquired.

Emitted optical energy traversing to more distant surface regions of target object 20 before being reflected back toward system 100 will define a longer time-of-flight than radiation falling upon and being reflected from a nearer surface portion of the target object (or a closer target object). For example the time-of-flight for optical energy to traverse the roundtrip path noted at t1 is given by t1=2·Z1/C, where C is velocity of light. A TOF sensor system can acquire three-dimensional images of a target object in real time. Such systems advantageously can simultaneously acquire both luminosity data (e.g., signal amplitude) and true TOF distance measurements of a target object or scene.

As described in U.S. Pat. No. 6,323,942, in one embodiment of system 100 each pixel detector 140 has an associated high speed counter that accumulates clock pulses in a number directly proportional to TOF for a system-emitted pulse to reflect from an object point and be detected by a pixel detector focused upon that point. The TOF data provides a direct digital measure of distance from the particular pixel to a point on the object reflecting the emitted pulse of optical energy. In a second embodiment, in lieu of high speed clock circuits, each pixel detector 140 is provided with a charge accumulator and an electronic shutter. The shutters are opened when a pulse of optical energy is emitted, and closed thereafter such that each pixel detector accumulates charge as a function of return photon energy falling upon the associated pixel detector. The amount of accumulated charge provides a direct measure of round-trip TOF. In either embodiment, TOF data permits reconstruction of the three-dimensional topography of the light-reflecting surface of the object being imaged.

In some TOF systems, array 130 may comprise an array of charge-coupled devices (CCDs) or CMOS devices. CCDs typically are configured in a so-called bucket-brigade whereby light-detected charge by a first CCD is serial-coupled to an adjacent CCD, whose output in turn is coupled to a third CCD, and so on. Bucket-brigade configurations generally preclude fabricating processing circuitry on the same IC containing the CCD array. Further, CCDs provide a serial readout as opposed to a random readout. For example, if a CCD range finder system were used in a digital zoom lens application, even though most of the relevant data would be provided by a few of the CCDs in the array, it would nonetheless be necessary to readout the entire array to gain access to the relevant data, a time consuming process. In still and some motion photography applications, CCD-based systems might still find utility.

Many factors including ambient light can affect reliability of data acquired by TOF systems. In some applications the transmitted optical energy may be emitted multiple times using different systems settings to increase reliability of the acquired TOF measurements. For example, the initial phase of the emitted optical energy might be varied to cope with various ambient and reflectivity conditions. The amplitude of the emitted energy might be varied to increase system dynamic range. The exposure duration of the emitted optical energy may be varied to increase dynamic range of the system. Further, frequency of the emitted optical energy may be varied to improve the unambiguous range of the system measurements.

U.S. Pat. No. 6,580,496 entitled Systems for CMOS-Compatible Three-Dimensional Image-Sensing Using Quantum Efficiency Modulation (2003) discloses a sophisticated system in which relative phase ($\phi$) shift between the transmitted light signals and signals reflected from the target object is examined to acquire distance z. (U.S. Pat. No. 6,515,740 issued from the same application and is a companion application to U.S. Pat. No. 6,580,496.) Detection of the reflected light signals over multiple locations in a pixel array results in measurement signals that are referred to as depth images. FIG. 2A depicts a system 100' according to the '496 patent, in which an oscillator 115 is controllable by microprocessor 160 to emit high frequency (perhaps 200 MHz) component periodic signals, ideally representable as A·cos($\omega$t). Emitter 120 transmitted optical energy having low average and peak power in the tens of mW range, which emitted signals permitted use of inexpensive light sources and simpler, narrower bandwidth (e.g., a few hundred KHz) pixel detectors 140'. Unless otherwise noted, elements in FIG. 2A with like reference numerals to elements in FIG. 1 may be similar or identical elements.

In system 100' there will be a phase shift $\phi$ due to the time-of-flight (TOF) required for energy transmitted by emitter 120 ($S_1$=cos($\omega$t)) to traverse distance z to target object 20, and the return energy detected by a photo detector 140' in array 130', $S_2$=A·cos($\omega$t+$\phi$), where A represents brightness of the detected reflected signal and may be measured separately using the same return signal that is received by the pixel detector. FIGS. 2B and 2C depict the relationship between phase shift $\phi$ and time-of-flight, again assuming for ease of description a sinusoidal waveform. The period for the waveforms of FIGS. 2B and 2C is T=2$\pi$/$\omega$.

The phase shift $\phi$ due to time-of-flight is:

$$\phi=2\cdot\omega\cdot z/C=2\cdot(2\pi f)\cdot z/C$$

where C is the speed of light 300,000 Km/sec. Thus, distance z from energy emitter (and from detector array) to the target object is given by:

$$z=\phi\cdot C/2\omega=\phi\cdot C/\{2\cdot(2\pi f)\}$$

While many types of three-dimensional TOF imaging systems are known in the art, obtaining reasonably accurate depth images from such systems can be challenging. Various techniques for acquiring and processing three dimensional imaging have been developed by assignee herein Canesta, Inc. of San Jose, Calif. For example, U.S. Pat. No. 6,522,395 (2003) to Bamji et al. describes Noise Reduction Techniques Suitable for Three-Dimensional Information Acquirable with CMOS-Compatible Image Sensor ICs; and U.S. Pat. No. 6,512,838 to Rafii et al. (2003) describes Methods for Enabling Performance and Data Acquired from Three-Dimensional Image Systems. U.S. Pat. No. 6,678,039 to Charbon (2004) discloses Method and System to Enhance Dynamic Range Conversation Useable with CMOS Three-Dimensional Imaging. More recently, U.S. Pat. No. 6,919,549 to Bamji et al. (2005) describes Method and System to Differentially Enhance Sensor Dynamic Range.

In embodiments of the above-noted TOF systems developed by Canesta, Inc., detection current output by individual pixel detector sensors was directly integrated and collected using an integration capacitor to develop a detection voltage signal. In U.S. Pat. No. 6,678,039, the integrated detection voltage signal was compared to a threshold voltage and whenever the threshold voltage was exceeded, the capacitor was reset, and the number of resets was stored. In this fashion, the total change in detection voltage could be measured, and dynamic range could be extended by virtue of the resets. In U.S. Pat. No. 6,919,549, before start of integration, a fixed potential was imposed upon each capacitor. In the '549 invention, during integration, the potential across each capacitor could be reset before the integration detection voltage signal reach saturation, or overload, levels. Again the total change in detection voltage could be measured and dynamic range could be extended by virtue of the pre-integration voltage and resets. Preferably the sensors in many of these embodiments were operable in differential mode, to better reject common mode signals such as ambient light.

As noted in many of the above-referenced patents, sensor performance may be impaired by many parameters. Some or all sensors may not receive sufficient optical energy to perform well, in which case a reliable measurement of depth z cannot be obtained. Similarly, some or all sensors may receive too much optical energy, in which case the sensors may overload and saturate, with the result that a reliable measurement of depth z cannot be obtained. It is when a sensor receives an amount of optical energy within the dynamic range of the sensor that an accurate sensor output signal is provided, and reliable measurements of depth z can be obtained.

Thus there is a need for a mechanism for use with pixel detector sensors in a CMOS three-dimensional TOF system to maximize the number of sensors that are operating within their dynamic range. Preferably such mechanism should function dynamically such that as system parameters that affect sensor performance change, appropriate compensating changes or corrections to individual pixel detector sensors can be made. The desired result is that more valid z-depth measurement data will be provided despite variations in such system parameters.

The present invention provides a method and sub-system to dynamically provide compensating changes to pixel detector sensors such that more valid z depth measurement data will be provided, despite changes in system parameters that would otherwise impair more of the z depth measurement data.

SUMMARY OF THE INVENTION

The present invention is preferably practiced with a TOF system that acquires phase information to determine z depth measurement data. The present invention dynamically controls at least one parameter of the TOF system such that a greatest number of individual pixel photodiode detector sensors operate within their dynamic range. Detection data is acquired representing active optical energy, e.g., detection responsive to optical energy emitted by the TOF system, e.g., modulated energy, and detection data is acquired representing passive or ambient optical energy that is unmodulated, e.g., detection when no optical energy has been emitted by the TOF system. These two modes are referred to as active brightness mode, and passive brightness mode.

Preferably operable with differential mode sensing, the present invention examines four phases of detected signals, after which the passive brightness mode (e.g., ambient light) amplitude component of the detected signals is examined. If brightness data indicate sensor saturation at present (e.g., ambient optical energy is too high for the pixel photodetectors to detect within their dynamic range), then the present invention commands one or more compensatory parameters in the TOF system, for example varying the number of common mode resets, varying the signal integration time, varying system gain, etc. An object is to maximize the number of pixel photodetectors that are operating within their intended dynamic range, and thus can output accurate depth data. More specifically, in one embodiment a histogram is calculated using active mode brightness mode. Thus, the present invention first compensates the TOF sensors by varying common mode resets to accommodate passive optical energy levels, and then to compensate for active optical energy levels. Embodiments of the present invention can also adjust common mode resets, system parameters including integration time and video gain. These adjustments may be in addition to or in lieu of common mode reset adjustments. Implementation of the present invention maximizes the number of pixel detector sensors in the sensor array that output valid depth measurements.

Other features and advantages of the invention will appear from the following description in which the preferred embodiments have been set forth in detail, in conjunction with their accompanying drawings.

BRIEF DESCRIPTION OF THE DRAWINGS

FIG. 4 depicts exemplary pseudocode by which following traversal of depth, brightness, and active brightness images, pixel detectors are assigned to one of several quantized groups depending upon amount of active optical energy seen by each pixel detector, according to an embodiment of the present invention;

FIG. 5 depicts exemplary pseudocode by which corrective command(s) are determined as needed to vary at least one TOF system parameter to maximize number of pixel detectors operating within their intended detector dynamic range, according to an embodiment of the present invention; and FIG. 6 depicts exemplary pseudocode by which a histogram of all pixel detectors is generated for active brightness and passive brightness images, after which an estimation function is determined, and corrective command(s) are determined as needed to vary at least one TOF system parameter to maximize number of pixel detectors operating within their intended dynamic range, according to an embodiment of the present invention.

DETAILED DESCRIPTION OF THE INVENTION

Figure 3:
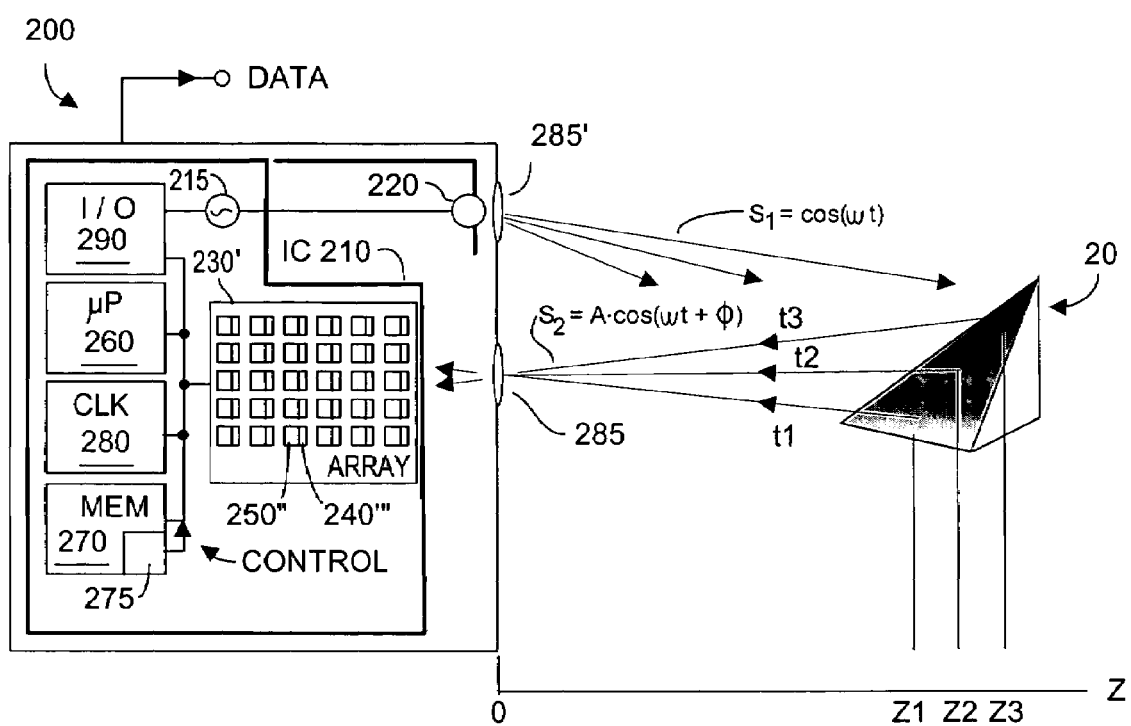
FIG. 3 is a block diagram of a preferred phase-shift system implementation useable with embodiments of the present invention.

FIG. 3 depicts a TOF system 200 with which the present invention, denoted 275, may be practiced to improve the validity of z depth measurements output as DATA. Element 275 preferably is software that when executed by microprocessor 260 carries out method steps, exemplified by the pseudocode of FIGS. 4-6. The present invention maximizes the number of photodetector pixels 240''' in array 230 that operate within their intended dynamic range. The present invention can exercise control (depicted in FIG. 3 as CONTROL) over at least one parameter of TOF system 200. For example, if the present invention determines that too many photodetectors are saturating, a CONTROL signal can be generated varying at least one TOF system 200 parameter. For example, the CONTROL signal may cause TOF system 200 to more frequently reset common mode in the detectors, as described in U.S. Pat. No. 6,919,549 (2005) Method and System to Differentially Enhance Sensor Dynamic Range, and/or to reduce detection integration or exposure time, and/or to reduce video or detection system gain. Conversely, if it is determined that too many photodetector pixels are receiving insufficient optical energy, then the CONTROL signal generated by the present invention can vary at least one TOF system 200 parameter in the opposite direction, e.g., to reduce the number of common mode resets in the detectors, to increase detection integration or exposure time, to increase detector and/or video gain. Preferably the present invention dynamically and automatically varies at least one TOF system parameter such that at any given time, a maximum number of photodetector pixels are responded to optical energy within their intended dynamic range.

It is useful at this junction to describe TOF system 200 in FIG. 3. Unless otherwise noted, elements in FIG. 3 bearing the same element numbers as the TOF system in FIG. 1 may be similar elements. In FIG. 3, system 200 includes a driver 215, preferably commanded by microprocessor 260 that drives optical light source or emitter 220. An exemplary emitter 220 may be a low peak power laser diode, or low peak power LED, that can output a periodic signal with 50 mW or so peak power when driven with a repetition rate of a few hundred MHz and, in the preferred embodiment, a duty cycle close to 100%, as duty cycle is defined herein. Emitted optical energy may have an exemplary wavelength of perhaps 800 nm. A lens 285' is used to focus the optical light energy transmitted from emitter 220.

CMOS-compatible IC 210 will preferably have fabricated thereon oscillator 215 driver, array 230' (comprising perhaps 100×100 (or more) pixel detectors 240 or 240''', and perhaps 100×100 (or more) associated electronic processing circuits 250''), microprocessor or microcontroller unit 260, memory 270 (which preferably includes random access memory or RAM and read-only memory or ROM), various computing and input/output (I/O) circuitry 290, including, for example an analog/digital (A/D) conversion unit providing perhaps 8-bit A/D conversions of phase information φ detected by the various pixel detectors in array 230', circuitry associated with video gain for overall system 200, among other functions, and clock circuitry 280. Depending upon implementation, a single on-chip A/D converter function could be provided, or a dedicated A/D converter could be provided as part of each electronic processing circuit 250. I/O circuit 290 preferably can also provide a signal to control frequency of the oscillator 215 and thus to control optical energy emitter 220.

The DATA output line shown in FIG. 3 represents any or all information calculated by system 200. Preferably microprocessor 260 can examine consecutive frames stored in RAM in memory 270 to identify objects in the field of view scene. Microprocessor 260 can then compute z-distance and can compute object velocity dz/dt, dx/dt, dy/dt. Further, microprocessor 260 and associated on-chip circuitry can be programmed to recognize desired image shapes, for example a user's fingers if an application using system 200 to detect user interface with a virtual input device.

Among its other functions, microprocessor 260 acting through interface circuit 280 causes driver 225 to oscillate periodically with a desired duty cycle at a desired frequency, for example $f_1$=200 MHz. In response to signals from oscillator driver 225, laser diode or LED 220 emits optical energy at the desired frequency, e.g., $f_1$=200 MHz and duty cycle. Again, while a sinusoid or cosine waveform is assumed for ease of mathematical representation, a periodic waveform with similar duty cycle, repetition rate and peak power may be used, e.g., perhaps squarewaves.

The optical energy whose periodic high frequency component is ideally represented as $S_1$=cos(ωt) is focused by optional lens 285' upon target object 20, some distance z away. At least some of the optical energy falling upon target 20 will be reflected back towards system 200 and will be detected by one or more pixel detectors 240 in array 230. Due to the distance z separating system 200, more particularly a given pixel detector 240 (240''') in array 230, and the target point on object 20, the detected optical energy will be delayed in phase by some amount φ that is proportional to time-of-flight, or to the separation distance z. The incoming optical energy detected by different pixel detectors 240 can have different phase φ since different times-of-flight or distances z are involved. In various figures including FIG. 3, the incoming optical energy is denoted as $S_2$=A·cos(ωt+φ), e.g., the AC component of a return signal that will in fact include a DC component. However the DC component is relatively unimportant and is not depicted in the figures.

As will be described, it is the function of electronics 250 (250'') associated with each pixel detector 240 (240''') in array 230' to examine and determine the relative phase delay, in cooperation with microprocessor 260 and software stored in memory 270 executed by the microprocessor. In an application where system 200 images a data input mechanism, perhaps a virtual keyboard, microprocessor 260 may process detection data sufficient to identify which of several virtual keys or regions on a virtual device, e.g., a virtual keyboard, have been touched by a user's finger or stylus. Thus, the DATA output from system 200 can include a variety of information, including without limitation distance z, velocity dz/dt (and/or dx/dt, dy/dt) of object 20, and object identification, e.g., identification of a virtual key contacted by a user's hand or stylus.

Figure 2A:
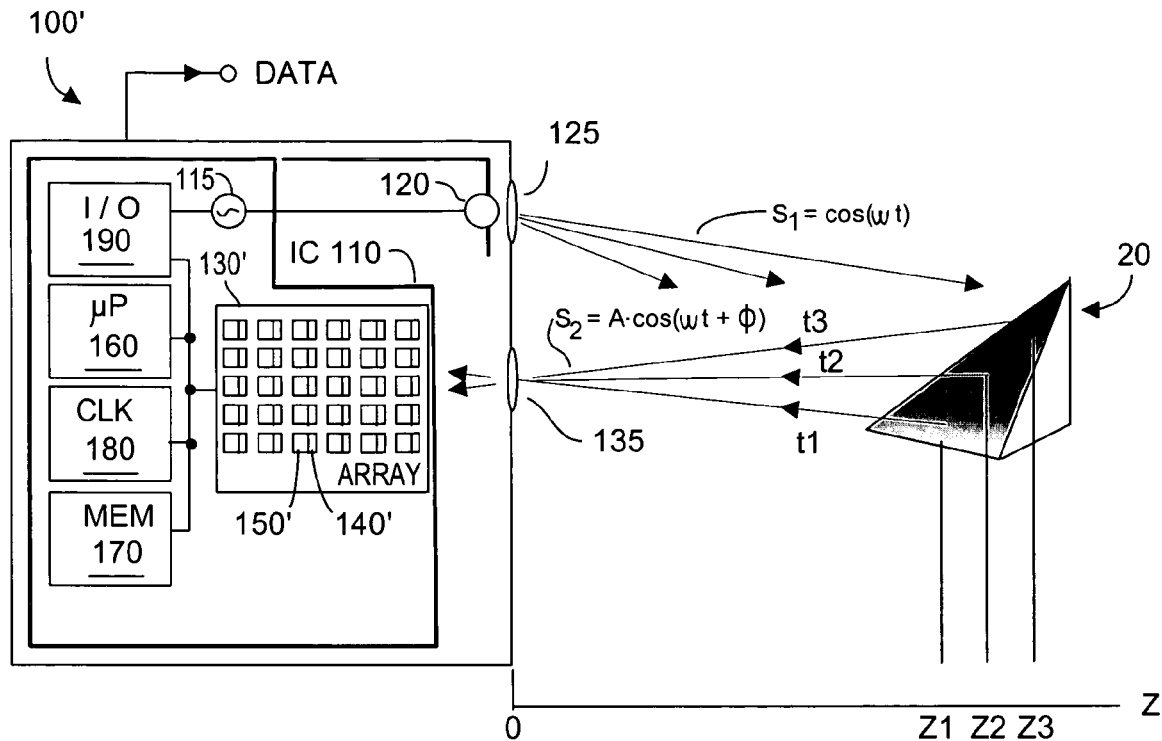
FIG. 2A depicts a phase-shift intensity and range finding system, according to the prior art.

FIG. 2A depicts the high frequency component of an exemplary idealized periodic optical energy signal emitted by TOF system 200, here a signal represented as cos(ωt) with period T=2π/ω. The signal is depicted as though it were AC-coupled in that any magnitude offset is not present. As described below, the operative frequency of the transmitted signal preferably was in the few hundred MHz range, and the average and the peak transmitted power may be relatively modest, e.g., less than about 50 mW or so.

Figure 2B:
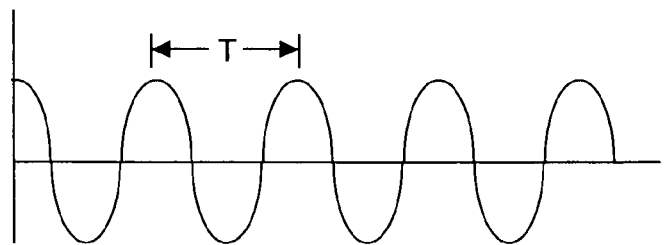
FIG. 2B depicts a transmitted periodic signal with high frequency components transmitted by the system of FIG. 2A, according to the prior art.
Figure 2C:
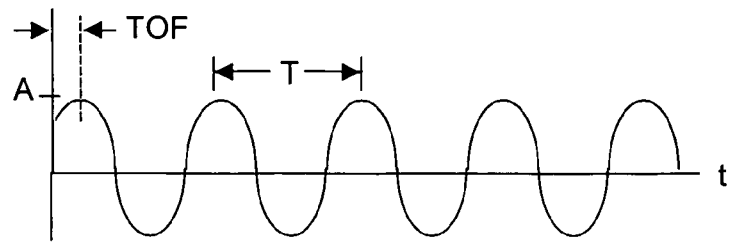
FIG. 2C depicts the return waveform with phase-delay for the transmitted signal of FIG. 2B, according to the prior art.

A portion of the transmitted energy reaches a target object 20 and is at least partially reflected back toward sensor array 230' via lens 285 for detection. FIG. 2B depicts the returned version of the transmitted waveform, denoted A·cos(ωt+φ), where A is an attenuation coefficient, and φ is a phase shift resulting from the time-of-flight (TOF) of the energy in traversing the distance from the '496 invention to the target object. Knowledge of TOF is tantamount to knowledge of distance z from a point on the object target, e.g., target 20, to the recipient pixel detector in the array of detectors within a system according to the '496 patent.

It will be appreciated that the source optical energy transmitted by system 200 is modulated, and thus the reflected fraction of such energy to be detected (so-called active optical energy) is likewise modulated. By contrast, ambient light, perhaps sunlight, is not modulated.

Figure 1:
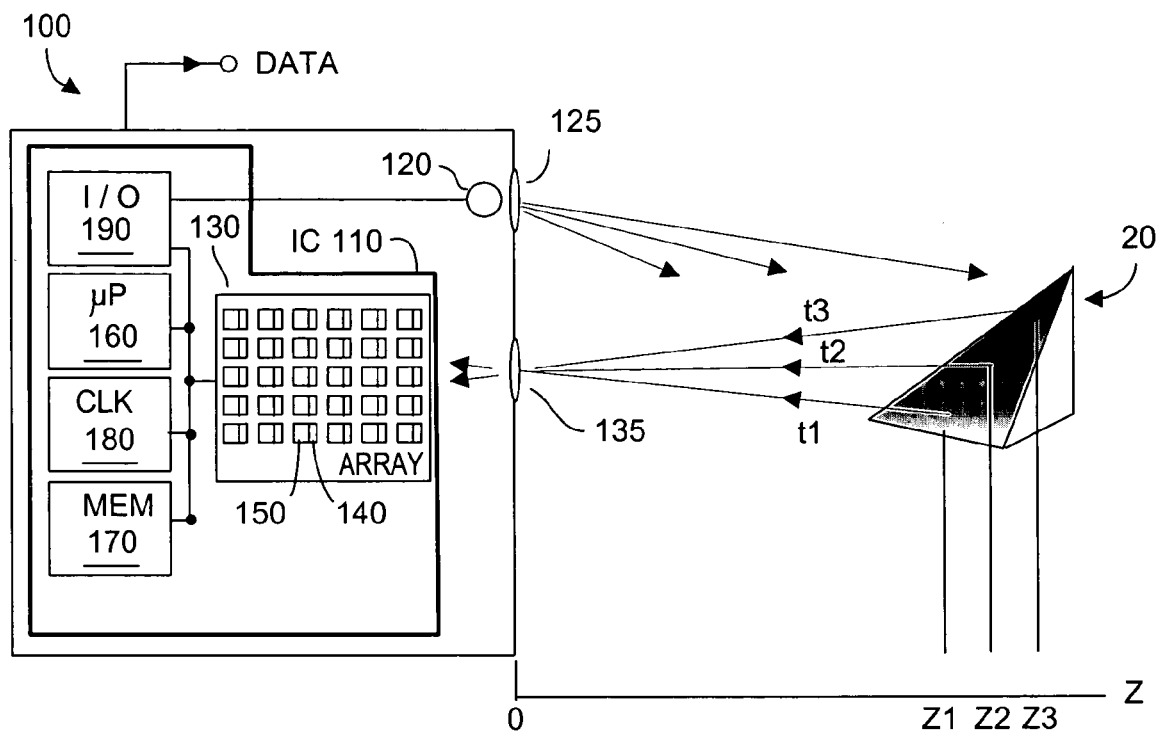
FIG. 1 is a diagram showing a generic luminosity-based range finding system, according to the prior art.

As will be described, it is the function of electronics 250 (or 250") associated with each pixel detector 240 (or 240'") in array 230' to examine and determine the relative phase delay, in cooperation with microprocessor 260 and software stored in memory 270 executed by the microprocessor. In an application where system 200 images a data input mechanism, perhaps a virtual keyboard, microprocessor 260 may process detection data sufficient to identify which of several virtual keys or regions on a virtual device, e.g., a virtual keyboard, have been touched by a user's finger or stylus. Thus, the DATA output from system 200 can include a variety of information, including without limitation distance z, velocity dz/dt (and/or dx/dt, dy/dt) of object 20, and object identification, e.g., identification of a virtual key contacted by a user's hand or stylus. Further details as to embodiments of pixel photodetectors and associated electronics (240'", 250'" in FIG. 3 herein) may be found, for example, in U.S. Pat. No. 6,919,549 entitled Method and System to Differentially Enhance Sensor Dynamic Range (2005), assigned to Canesta, Inc. In FIG. 1 of the '549 patent, pixel photodetectors and associated electronics are denoted 70, 80 respectively, and in FIG. 11 of the '549 patent, these components are denoted as 70', 80 respectively. Additional details may also be found in U.S. Pat. No. 6,580,496 entitled Systems for CMOS-Compatible Three-Dimensional Image Sensing Using Quantum Efficiency Modulation (2003), assigned to Canesta, Inc. In the ;496 patent, pixel photodetectors and their associated electronics are denoted 240, 250 respectively; see for example FIG. 3 therein.

At any given moment, TOF system 200 in FIG. 3 can acquire three types of images: a depth (or phase) image, an active brightness image (e.g., produced responsive to the modulated optical energy emitted by the TOF system, and a brightness image (e.g., resulting from modulated optical energy emitted by the TOF system as well as from ambient light, which is unmodulated. The depth image is the image that provides the z distance or depth value for each pixel detector 240'" in array 230'. It will be appreciated that whereas the depth or phase image, and the active brightness image contain reflected optical energy that is phase modulated, the passive or brightness image results from ambient light and is not modulated.

Referring now to FIG. 4, one embodiment of the present invention is represented by the exemplary pseudocode 275 preferably stored in memory 270 and executed by microprocessor 260. As will be described, upon execution by microprocessor 260, the present invention 275 carries out steps to determine whether individual pixel photodetectors are operating within their dynamic range. Stated differently, a pixel photodetector that receives insufficient optical energy to be reliably detected cannot yield a reliable depth measurement. Similarly, a pixel photodetector that receives excess levels of optical energy to be reliably detected will saturate and cannot yield a reliable depth measurement. However a pixel photodetector that receives levels of optical energy within a desired dynamic range of operation can reliably detect such optical energy, and will provide a reliable depth measurement. Embodiments of the present invention seek to maximize the number of pixel photodetectors that are operating within their intended dynamic range, by varying TOF system parameter(s) as may be necessary.

Referring to FIG. 4, the depth image is the image that provides the z depth value for each pixel photodetector in the detector array, which comprises rows (r) and columns (c) of pixel photodetectors. If for any reason the depth cannot be measured, then the present invention assigns a NOT_VALID value to the depth, for instance value 0. According to an embodiment of the present invention, a pixel photodetector becomes NOT_VALID, if it receives too little active light returned from target object 20, of it the pixel photodetector receives too much passive or active light, resulting in detector saturation. An objective of the present invention is to minimize the number of NOT_VALID pixels, for example by commanding via a CONTROL signal changes to one or more TOF system parameters. This aspect of the present invention is exemplified by the pseudocode of FIG. 5.

In a preferred embodiment, the number of NOT_VALID pixel photodetectors is minimized by obtaining statistics from the brightness and active brightness image. Those pixel photodetectors receiving insufficient active light can be determined from the active brightness image. Similarly, those pixel photodetectors receiving excessive light can be determined from the passive brightness image.

Thus, a first step of the present invention is to traverse the depth, the brightness, and the active brightness images. From these three images the present invention assigns to each pixel photodetector a quantized value, for example, a value selected from the group NO_LIGHT, NOT_ENOUGH_LIGHT, NORMAL_LIGHT, and TOO_MUCH_LIGHT.

After this traversal, the present invention groups every pixel photodetector into one of these pixel photodetector types. Then a histogram of all pixel photodetector types is obtained, i.e. how many pixel photodetectors are there in each quantized group TOO_MUCH_LIGHT, NOT_ENOUGH_LIGHT, NO_LIGHT, and NORMAL_LIGHT.

Next the algorithm steps shown in FIG. 5 are carried out and one or more TOF system 200 parameters are caused to be varied by a CONTROL signal generated by the present invention. Application of the CONTROL signal to TOF system 200 will, in closed-loop fashion, seek to correct the too much or too little light condition observed among the individual pixel photodetectors in array 230'. For example, if too many pixel photodetectors have been classified into the NOT_ENOUGH_LIGHT group, the CONTROL signal could command any or all of the following TOF system parameter changes: increase shutter or integration of detection charge time, decrease common mode resets, increase system video gain, and so forth. Conversely, if the present invention determines too many pixel photodetectors are classified into the TOO_MUCH_LIGHT group, then an appropriate COMMAND control signal will cause one or more TOF system 200 parameters to be varied to reduce likelihood of pixel photodetector saturation. For example shutter or integration of detection charge time may now be decreased, additional common mode resets can be commanded, decreased system video gain is desired, and so forth. In this fashion, the present invention seeks to maximize the number of pixel photodetectors that fall into the NORMAL_LIGHT group. When this desired result is obtained, a maximum number of pixel photodetectors will be operating within their intended dynamic range, and will be outputting accurate depth data.

Referring now to the exemplary pseudocode of FIG. 6, in another embodiment, the present invention makes an initial guess as to the optimum amount of required change in light to increase the number of pixel photodetectors that will fall into the NORMAL_LIGHT group. First a histogram of all pixel photodetectors is determined for the active brightness image and for the passive brightness image. Next an estimation function of different conditions is determined. The pseudocode of FIG. 6 implements an estimated change in light, denoted ΔL. The function f(ΔL,) returns the number of estimated good pixels, e.g., pixel photodetectors that will be in the NORMAL_LIGHT group when the light is varied by ΔL. One an optimized value of ΔL is determined, the necessary change is applied upon any combination of desirably TOF system 200 parameters, e.g., exposure shutter integration charge time, number of common mode resets, video gain.

In another embodiment, the function f(L, ΔL) traverses over the image on each pixel photodetector, as opposed to the obtained histograms. An estimated good_pixel_count is determined by counting the per-pixel photodetector good_pixel decisions. Once the optimized ΔL value is determined, any necessary changes can be commanded on any combination of TOF system parameters, e.g., exposure or shutter integration charge time, number of common mode resets, video gain, etc.

In summary, aspects of the present invention implement an automated gain control on pixel photodetectors in a TOF system. Various embodiments determined the necessary amount of change in light needed to optimize the number of pixel photodetectors that will yield valid depth measurements. In closed-loop fashion, one or more TOF system parameters can be controlled to obtain the desired result.

Modifications and variations may be made to the disclosed embodiments without departing from the subject and spirit of the invention as defined by the following claims.

What is claimed is:

1. For use with a time-of-flight (TOF) system that illuminates a target, a distance z from said TOF system, with emitted optical energy having a modulated periodic waveform that includes a high frequency component, and that detects a fraction of said emitted optical energy with an array of pixel photodetectors operable in at least two phases to determine data proportional to said distance z, said TOF system operable to determine distance z independently of reflectivity of said target, a method to automatically control detection gain of said pixel photodetectors, the method comprising the following steps:
   (a) identifying which of said pixel photodetectors are receiving excessive levels of emitted optical energy to output reliable detection data, which of said pixel photodetectors are receiving insufficient levels of emitted optical energy to output reliable detection data, and which of said pixel photodetectors are receiving adequate levels of emitted optical energy to output reliable detection data;
   (b) designating one of at least three groups into which pixel photodetectors identified in step (a) are placed, comprising (i) said pixel photodetectors receiving excessive levels of emitted optical energy, (ii) said pixel photodetectors receiving insufficient levels of emitted optical energy, and (iii) said pixel photodetectors receiving adequate levels of emitted optical energy; and
   (c) if a highest number of said pixel photodetectors are members of a group comprising (i) said pixel photodetectors receiving excessive levels of emitted optical energy, varying at least one system parameter associated with said TOF system to reduce levels of emitted optical energy presented to said pixel photodetectors; and if a highest number of said pixel photodetectors are members of a group comprising (ii) said pixel photodetectors receiving insufficient levels of emitted optical energy, varying at least one system parameter associated with said TOF system to increase levels of emitted optical energy presented to said pixel photodetectors.

2. The method of claim 1, wherein said at least one system parameter is selected from a group consisting of pixel photodetector integration time, number of detection common mode resets, and video gain.

3. The method of claim 1, wherein at least one of step (a) and step (b) is carried out in software executable by a processor.

4. The method of claim 1, wherein at step (a), identification of said pixel photodetectors receiving excessive levels of emitted optical energy is determined from a passive brightness image acquired by said TOF system.

5. The method of claim 1, wherein at step (a), identification of said pixel photodetectors receiving insufficient levels of emitted optical energy is determined from an active brightness image acquired by said TOF system.

6. The method of claim 1, wherein at least two of steps (a), (b), and (c) are implemented in software storable in memory associated with said TOF system and executable by a microprocessor associated with said TOF system.

7. For use with a time-of-flight (TOF) system that illuminates a target, a distance z from said TOF system, with emitted optical energy having a modulated periodic waveform that includes a high frequency component, and that detects a fraction of said emitted optical energy with an array of pixel photodetectors operable in at least two phases to determine data proportional to said distance z, said TOF system operable to determine distance z independently of reflectivity of said target, a control system to automatically control detection gain of said pixel photodetectors, the control system comprising:
   means for identifying which of said pixel photodetectors are receiving excessive levels of emitted optical energy to output reliable detection data, which of said pixel photodetectors are receiving insufficient levels of emitted optical energy to output reliable detection data, and which of said pixel photodetectors are receiving adequate levels of emitted optical energy to output reliable detection data;
   means for designating one of at least three groups into which pixel photodetectors identified by said means for identifying are placed, designation choices comprising (i) said pixel photodetectors receiving excessive levels of emitted optical energy, (ii) said pixel photodetectors receiving insufficient levels of emitted optical energy, and (iii) said pixel photodetectors receiving adequate levels of emitted optical energy; and
   means for varying at least one system parameter associated with said TOF system;
   wherein said means for varying varies at least one system parameter associated with said TOF system to reduce levels of emitted optical energy presented to said pixel photodetectors if said means for designating determines that a highest number of said pixel photodetectors are members of a group comprising said pixel photodetectors receiving excessive levels of emitted optical energy; and
   wherein said means for varying varies at least one system parameter associated with said TOF system to increase levels of emitted optical energy presented to said pixel photodetectors if a highest number of said pixel photodetectors are members of a group comprising said pixel photodetectors receiving insufficient levels of emitted optical energy.

8. The control system claim 7, wherein said at least one system parameter is selected from a group consisting of pixel photodetector integration time, number of detection common mode resets, and video gain.

9. The control system of claim 7, wherein at least one of said means for identifying and said means for designating is implemented in software executable by a processor associated with said TOF system.

10. The control system of claim 7, wherein said means for identifying uses a passive brightness image acquired by said TOF system to determine which if any of said pixel photodetectors are receiving excessive levels of emitted optical energy.

11. The control system of claim 7, wherein said means for identifying uses an active brightness image acquired by said TOF system to determine which if any of said pixel photodetectors are receiving insufficient levels of emitted optical energy.

12. For use with a time-of-flight (TOF) system that illuminates a target, a distance z from said TOF system, with optical energy having a modulated periodic waveform that includes a high frequency component, and that detects a fraction of said illumination with an array of pixel photodetectors operable in at least two phases to determine data proportional to said distance z, said TOF system operable to determine distance z independently of ambient light, a method to automatically control detection gain of said pixel photodetectors, the method comprising the following steps:
(a) identifying from a passive brightness image acquired by said TOF system which of said pixel photodetectors are receiving excessive levels of emitted optical energy to output reliable detection data, and identifying from an active brightness image which of said pixel photodetectors are receiving insufficient levels of emitted optical energy to output reliable detection data and forming a histogram of such identification;
(b) using identification information from step (a) to form a histogram representing number of said pixel photodetectors receiving excessive levels of emitted optical energy, number of said pixel photodetectors receiving insufficient levels of emitted optical energy, and number of said pixel photodetectors receiving neither excessive nor insufficient levels of emitted optical energy;
(c) estimating variation in at least one system parameter of said TOF system to produce a change in light ΔL that increases said number of said pixel photodetectors receiving neither excessive nor insufficient levels of emitted optical energy;
(d) varying at least one system parameter of said TOF system to increase said number of said pixel photodetectors receiving neither excessive nor insufficient levels of emitted optical energy.

13. The method of claim 12, wherein said at least one system parameter is selected from a group consisting of pixel photodetector integration time, number of detection common mode resets, and video gain.

14. The method of claim 12, wherein at least two of steps (a), (b), and (c) are implemented in software executable by a processor.

15. For use with a time-of-flight (TOF) system that illuminates a target, a distance z from said TOF system, with emitted optical energy having a modulated periodic waveform that includes a high frequency component, and that detects a fraction of said emitted optical energy with an array of pixel photodetectors operable in at least two phases to determine data proportional to said distance z, said TOF system operable to determine distance z independently of ambient light, a control system to automatically control detection gain of said pixel photodetectors, said control system comprising:
means for identifying from a passive brightness image acquired by said TOF system which of said pixel photodetectors are receiving excessive levels of emitted optical energy to output reliable detection data, and for identifying from an active brightness image which of said pixel photodetectors are receiving insufficient levels of emitted optical energy to output reliable detection data and forming a histogram of such identification;
means for forming a histogram, using identification information from said means for identifying, representing number of said pixel photodetectors receiving excessive levels of emitted optical energy, number of said pixel photodetectors receiving insufficient levels of optical energy, and number of said pixel photodetectors receiving neither excessive nor insufficient levels of emitted optical energy;
means for estimating variation in at least one system parameter of said TOF system to produce a change in light ΔL that increases said number of said pixel photodetectors receiving neither excessive nor insufficient levels of emitted optical energy; and
means for varying at least one system parameter of said TOF system to increase said number of said pixel photodetectors receiving neither excessive nor insufficient levels of emitted optical energy.

16. The control system of claim 15, wherein said at least one system parameter is selected from a group consisting of pixel photodetector integration time, number of detection common mode resets, and video gain.

17. The control system of claim 15, wherein at least two of said means for identifying, said means for forming, and said means for estimating are implemented in software executable by a processor.

18. For use with a time-of-flight (TOF) system that illuminates a target, a distance z from said TOF system, with emitted optical energy having a modulated periodic waveform that includes a high frequency component, and that detects a fraction of said emitted optical energy with an array of pixel photodetectors operable in at least two phases to determine data proportional to said distance z, said TOF system operable independently of ambient light, a method to automatically control detection gain of said pixel photodetectors, the method comprising the following steps:
(a) identifying from a passive brightness image acquired by said TOF system which of said pixel photodetectors are receiving excessive levels of emitted optical energy to output reliable detection data, and identifying from an active brightness image which of said pixel photodetectors are receiving insufficient levels of emitted optical energy to output reliable detection data and forming a histogram of such identification;
(b) using identification information from step (a) to traverse said active brightness image and said passive brightness image to determine therefrom number of said pixel photodetectors receiving insufficient levels of emitted optical energy, and number of said pixel photodetectors receiving neither excessive nor insufficient levels of emitted optical energy;
(c) estimating variation in at least one system parameter of said TOF system to produce a change in light ΔL that increases said number of said pixel photodetectors receiving neither excessive nor insufficient levels of emitted optical energy; and (d) varying at least one system parameter of said TOF system to increase said number of said pixel photodetectors receiving neither excessive nor insufficient levels of emitted optical energy.

19. The method of claim 18, wherein said at least one system parameter is selected from a group consisting of pixel photodetector integration time, number of detection common mode resets, and video gain.

20. For use with a time-of-flight (TOF) system that illuminates a target, a distance z from said TOF system, with optical energy having a modulated periodic waveform that includes a high frequency component, and that detects a fraction of said illumination with an array of pixel photodetectors operable in at least two phases to determine data proportional to said distance z, said TOF system operable independently of reflectivity of said target, a control system to automatically control detection gain of said pixel photodetectors, the control system comprising:

means for identifying from a passive brightness image acquired by said TOF system which of said pixel photodetectors are receiving excessive levels of emitted optical energy to output reliable detection data, and identifying from an active brightness image which of said pixel photodetectors are receiving insufficient levels of emitted optical energy to output reliable detection data and forming a histogram of such identification;

means for traversing said active brightness image and said passive brightness image and for determining therefrom number of said pixel photodetectors receiving insufficient levels of emitted optical energy, and number of said pixel photodetectors receiving neither excessive nor insufficient levels of emitted optical energy;

means for estimating variation in at least one system parameter of said TOF system to produce a change in light $\Delta L$ that increases said number of said pixel photodetectors receiving neither excessive nor insufficient levels of emitted optical energy; and means for varying at least one system parameter of said TOF system to increase said number of said pixel photodetectors receiving neither excessive nor insufficient levels of emitted optical energy.

* * * * *